April 24, 1934.　　　N. GRON　　　1,956,023
TOOL HOLDER
Filed Oct. 23, 1929　　2 Sheets-Sheet 1
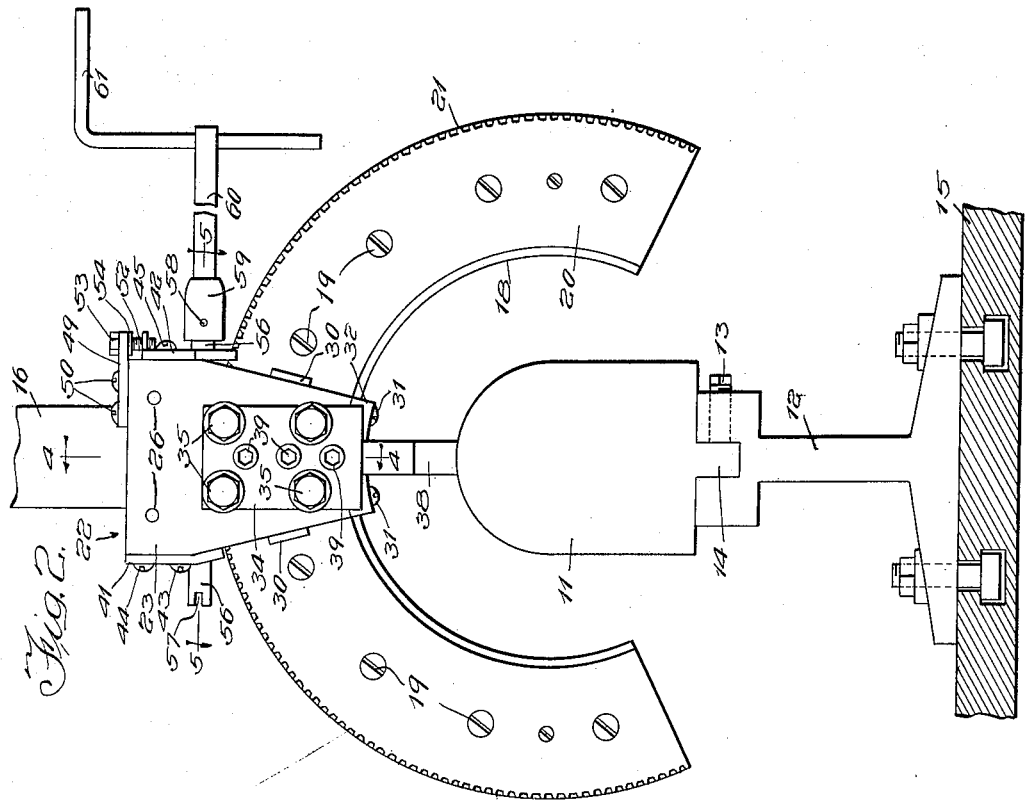
Witness:
William P. Kilroy
Inventor,
Nicholas Gron
By Hill & Hill
Attys.

April 24, 1934.　　　　　　　N. GRON　　　　　　　1,956,023

TOOL HOLDER

Filed Oct. 23, 1929　　　　2 Sheets-Sheet 2

Witness:
William P. Kilroy

Inventor:
Nicholas Gron
Hill & Hill
Attys

Patented Apr. 24, 1934

1,956,023

UNITED STATES PATENT OFFICE 1,956,023

TOOL HOLDER

Nicholas Gron, Chicago, Ill.

Application October 23, 1929, Serial No. 401,901

3 Claims. (Cl. 90—52)

This invention relates to tool holders and means for controlling the operation thereof.

The present invention is particularly adapted for use in forming the cooperating parts of dies having their cooperating faces formed substantially on the arc of a circle, or in other instances wherein it is desired to form the finished face of the material treated on substantially the true arc of a circle.

One object of the present invention is to provide a tool holder which may be angularly adjusted with respect to its support in a manner to cause the cutting edge of the tool to traverse substantially the true arc of a circle.

Another object of the invention is to provide improved feeding mechanism for controlling the operation of the tool holder.

Another object of the invention is to provide means for securing the tool holder operating means rigidly against movement with respect to its support.

A further object of the invention is to provide means for disconnecting the feeding mechanism to permit movement of the holder independently thereof.

A still further object of the invention is to improve devices of the character disclosed in sundry details hereinafter described and particularly pointed out in the appended claims.

An embodiment of the present invention is shown for illustrative purposes in the accompanying drawings in which Fig. 1 is a side elevational view of a tool holder and support therefor illustrating an embodiment of the present invention adapted for use in forming convex surfaces or faces on the material to be treated;

Fig. 2 is an elevational view of the structure illustrated in Fig. 1 and taken as viewed in the direction indicated by the arrow A of Fig. 1;

Figure 3:
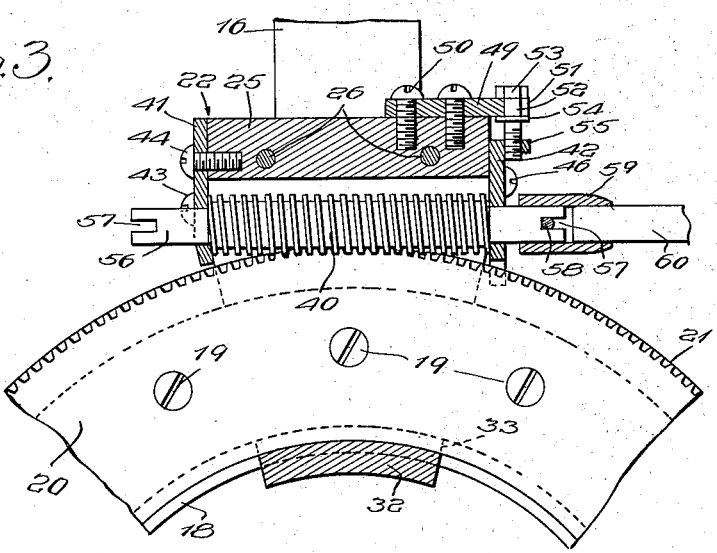
Fig. 3 is an enlarged sectional elevational view taken substantially on the line 3—3 of Fig. 1.
Figure 4:
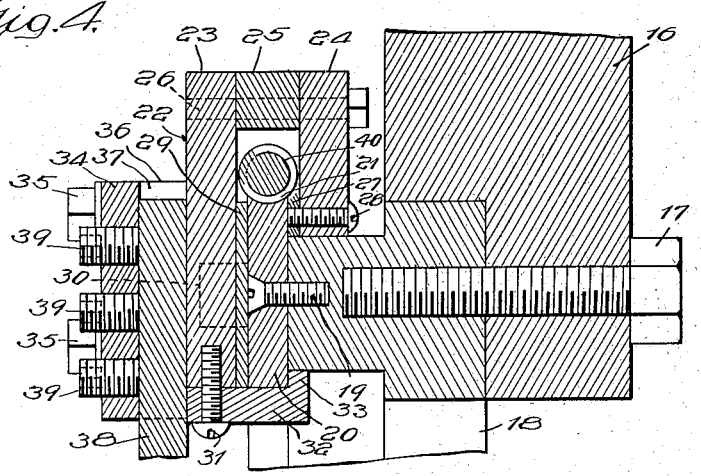
Fig. 4 is a sectional elevational view taken substantially on the line 4—4 of Fig. 2.
Figure 5:
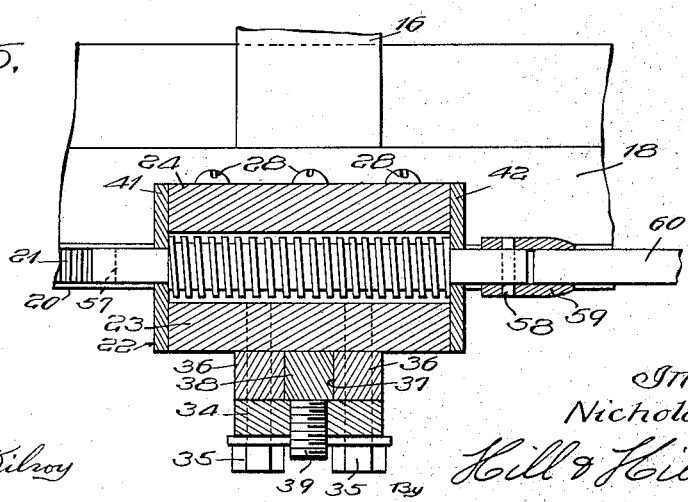
Fig. 5 is a sectional plan view taken on the line 5—5 of Fig. 2.

Referring particularly to Figs. 1 to 5, inclusive, of the drawings, the illustrative embodiment of the invention shown therein is particularly adapted for use in forming convex faces or surfaces on substantially the true arc of circle, as, for example, the male portion of a die formed from material indicated in Figs. 1 and 2 by the numeral 11, and shown in the present instance as secured to a jig 12 by means of set screws 13 engaging a tongue or longitudinal rib 14 formed on the underside of the material 11. The jig 12 is intended to be mounted on a longitudinally reciprocable member 15, as, for example, the bed plate of a planing machine having suitable means (not shown) associated therewith for moving the jig and parts mounted thereon longitudinally of the machine in the usual and well known manner.

The illustrative embodiment of the invention shown in Figs. 1 to 4, inclusive, comprises a supporting member 16 suitably mounted, preferably in a manner to permit of adjustment on the frame of a planer, or the like, and rigidly secured to the lower end of the member 16 by means of a bolt 17, is an arcuate guide or tool holder carrier 18 formed on substantially the true arc of a circle. Secured to the carrier 18 by means of screws 19 is an arcuate worm gear rack 20 having a curvature conforming substantially to that of the carrier 18, and provided on its periphery with teeth 21.

Slidably mounted on the rack and carrier is a tool holder designated as a whole by the numeral 22 and comprising plates 23 and 24 spaced apart at their upper ends by a filler or spacer block 25 and secured thereto and to each other by bolts 26. The upper end of the tool holder is adapted to embrace the upper edge of the rack 20 on opposite sides thereof and to be held in spaced relation with respect thereto by means of a wear plate 27 secured to the plate 24 by means of screws 28, and a wear plate 29 positioned between the rack 20 and adjacent face of the plate 23, and secured against relative movement with respect to the plate by outwardly turned end portions 30 adapted to engage opposite edges of the plate 23, as clearly shown in Figs. 1 and 2.

Secured to the lower edge of the plate 23 by means of screws 31 is a plate 32 having a laterally and upwardly extending flange portion 33 adapted to engage the inner face of the rack 20 adjacent its lower edge for securing the lower edge of the tool holder 22 against lateral movement with respect to the rack.

For securing the tool to the holder, a plate 34 is mounted to the plate 23 by means of bolts 35, the plate 34 being spaced from the plate 23 by means of spacer blocks 36, the blocks 36 being spaced from each other in a manner to provide an aperture 37 for the reception of a tool 38 or the like for operating upon the material to be treated such as that indicated by the numeral 11 in Figs. 1 and 2. The tool 38 may be secured in desired position with respect to the holder by means of set screws 39 mounted in the plate 34.

For feeding the tool holder and tool in either direction along the arcuate guide 18 and rack 20 in a manner to cause the cutting edge of the tool to traverse substantially the true arc of a circle in operating upon the material to be treated, a worm 40 having spirally formed teeth thereon, adapted to mesh with the teeth 21 of the rack 20, is rotatably mounted adjacent its end portions in bearing plates 41 and 42, the plate 41 being secured to the plates 23 and 24 by means of screws 43 and to the spacer block 25 by a screw 44, while the bearing plate 42 is secured to the plates 23 and 24 by means of clamping screws 45 and 46 adapted to extend through vertically disposed elongated apertures 47 and 48 respectively, (Fig. 1) formed in the bearing plate 42 in a manner to permit adjustment of the plate 42 with respect to the tool holder 22. Thus, it will be seen that by such an arrangement, the bearing plate 42 may be adjusted in a manner to move one end of the worm 40 about its bearing in the plate 41 as a fulcrum for positioning the worm with respect to the rack 20 thereby providing for efficient engagement of the cooperating portions of the worm and rack or for lifting the worm free from engagement with the rack in a manner to permit the operator to move the tool holder freely along the guide and rack without regard to the worm 40. This has been found to be desirable in setting up the work and positioning the tool holder preparatory to starting the forming operation.

For conveniently adjusting the bearing plate 42, a bracket 49 is secured to the block 25 by means of screws 50 in a manner to overhang the adjacent end of the block and is provided in its overhanging portion with a notch or slot 51 (Fig. 3) adapted to receive the shank portion of an adjusting bolt 52 provided at its upper end with a head 53 adapted to engage the upper side of the bracket 49, and intermediate its end portions, with a collar or shoulder 54 adapted to engage the lower face of the bracket 49, thereby preventing longitudinal movement of the bolt 52 with respect to the bracket. The lower end of the bolt 52 is adapted for threaded engagement with a flange 55 formed on the upper edge of the bearing plate 42 in a manner to move the bearing plate and adjacent end of the worm 40 upwardly or downwardly when the bolt 52 is rotated.

It will be observed from the foregoing description that to adjust the worm 40 with respect to the rack 20, the clamping screws 45 and 46 may be loosened slightly and by rotating the bolt 52 the bearing plate 43 and adjacent end of the worm 40 may be raised or lowered as desired. This construction and arrangement serves also as a means for securing the tool holder against movement along the rack 20 and guide 18, in that by forcing the bearing plate 42 downwardly a binding action may be obtained between the central portion of the worm 40 and adjacent portion of the rack 20, thereby preventing rotation of the worm 40 and permitting the operation of the tool for making a straight cut within the limits determined by the relative position of the work and opposite ends of the rack and guide 20 and 18, respectively.

For rotating the worm 40 in its bearings from opposites thereof, the opposite ends of the worm shaft 56 are adapted to extend beyond the bearing plates 41 and 42, and are provided with slots 57 adapted to receive a pin 58 mounted in a socket 59 carried by a handle or worm actuating device 60, at the outer end of which may be mounted a crank 61, or the like, to facilitate the rotation of the handle and worm in a manner to feed the tool holder and tool mounted thereon along the arcuate guide and rack to cause the cutting edge of the tool to engage the work and form a face thereon having substantially the true arc of a circle.

In Figs. 6 to 10, inclusive, the illustrative embodiment of the invention shown is particularly adapted for use in forming concave surfaces or faces on substantially the true arc of a circle, as, for example, the female portion of a die formed from material indicated in Figs. 6 and 7 by the numeral 62 having a tongue or longitudinal rib 63 formed thereon by which it may be secured to a jig such as that indicated by the numeral 12, Figs. 1 and 2 and in the manner above described with reference to the material 11 shown in Figs. 1 and 2 of the drawings. It will be understood that the material 62 will be moved longitudinally with respect to the cutting tool as described with reference to the material 11.

Obviously, the present invention is not limited to the precise construction and arrangement shown and described as the same may be variously modified. Moreover, all the features of the invention need not be used conjointly as the same may be used to advantage in variously different combinations and sub-combinations.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a device of the class described, the combination of a supporting member, an arcuate guide and worm gear rack mounted on said member, a tool holder adapted to receive a cutting tool mounted on said guide, a rotatable worm mounted in said holder and operatively related to said worm gear rack for moving said holder and the tool in either direction along said rack, and means comprising an adjusting screw and clamping means mounted on said holder for positioning said worm with respect to said rack and for securing said worm against rotation.

2. In a device of the class described, the combination of a supporting member, an arcuate guide and worm gear rack mounted on said member, a tool holder adapted to receive a cutting tool mounted on said guide, a worm operatively related to said rack for moving said holder and tool in either direction along the rack, a bearing plate for positioning the worm with respect to the rack, and an adjusting bolt mounted on the supporting member and engageable with said plate for forcing said worm against the rack in a manner to secure the worm against rotation.

3. In a device of the class described, the combination of a supporting member, an arcuate guide and worm gear rack mounted on said member, a tool holder adapted to receive a cutting tool mounted on said guide, a worm operatively related to said rack for moving said holder and tool in either direction along the rack, a bearing plate slidably mounted with respect to said member and engageable with said worm, and an adjustable bolt mounted on the supporting member and operatively related to said plate for securing the worm against rotation.

NICHOLAS GRON.

CERTIFICATE OF CORRECTION.

Patent No. 1,956,023.　　　　　　　　　　　　　　　　April 24, 1934.

NICHOLAS GRON.

It is hereby certified that error appears in the printed specification of the above numbered patent requiring correction as follows: Page 2, line 79, beginning with the words "In Figs. 6 to 10" strike out all to and including "rial 11." in line 94; and lines 144 and 145, claim 3, for "adjustable" read adjusting; and that the said Letters Patent should be read with these corrections therein that the same may conform to the record of the case in the Patent Office.

Signed and sealed this 29th day of May, A. D. 1934.

Bryan M. Battey (Seal)　　　　　　　　　　　　　　　　　　Acting Commissioner of Patents.